United States Patent
Katou et al.

(10) Patent No.: US 7,172,018 B2
(45) Date of Patent: Feb. 6, 2007

(54) VEHICLE AIR-CONDITIONING SYSTEM

(75) Inventors: Naoki Katou, Nagoya (JP); Shinichi Yoshida, Nisshin (JP); Makoto Mimoto, Chita-gun (JP)

(73) Assignee: Denso Corporation, Kariya (JP)

( * ) Notice: Subject to any disclaimer, the term of this patent is extended or adjusted under 35 U.S.C. 154(b) by 256 days.

(21) Appl. No.: 10/643,666

(22) Filed: Aug. 19, 2003

(65) Prior Publication Data
US 2004/0035568 A1    Feb. 26, 2004

(30) Foreign Application Priority Data
Aug. 20, 2002  (JP)  ............................. 2002-239459

(51) Int. Cl.
F25B 29/00 (2006.01)
B60H 1/00 (2006.01)
B60H 3/00 (2006.01)

(52) U.S. Cl. .................. 165/204; 165/202; 165/42; 165/43; 236/91 C; 236/91 D; 236/91 F; 62/229; 454/75

(58) Field of Classification Search ............... 165/204, 165/202, 42, 43; 236/91 D, 91 F, 91 C; 417/222.2; 62/229; 454/75
See application file for complete search history.

(56) References Cited

U.S. PATENT DOCUMENTS

| 4,562,954 A | * | 1/1986 | Kajita | 237/2 A |
| 4,681,153 A | * | 7/1987 | Uchida | 165/202 |
| 4,730,986 A | * | 3/1988 | Kayukawa et al. | 417/222.2 |
| 5,626,186 A | * | 5/1997 | Honda et al. | 165/43 |
| 6,389,824 B2 | * | 5/2002 | Ota et al. | 417/222.2 |
| 2002/0134540 A1 | * | 9/2002 | Ieda et al. | 165/204 |

FOREIGN PATENT DOCUMENTS

| JP | 60128012 A | * | 7/1985 |
| JP | A-2-88323 | | 3/1990 |
| JP | 04169321 A | * | 6/1992 |
| JP | 6-59774 | | 8/1994 |
| JP | A-09-52516 | | 2/1997 |
| JP | 10151933 A | * | 6/1998 |
| JP | 2002331820 A | * | 11/2002 |

* cited by examiner

Primary Examiner—John K. Ford
(74) Attorney, Agent, or Firm—Harness, Dickey & Pierce, PLC (57) ABSTRACT

A vehicle air-conditioning system improves a passenger's sensation of cooling by preventing air blown from a foot opening when a cooling load is low, creating a comfortable temperature distribution along the passenger's body. The vehicle air-conditioning system automatically selects a face mode when a target air temperature (TAO) is between a first predetermined temperature and a second predetermined temperature, which is higher than the first predetermined temperature, a bi-level mode when the TAO is higher than the first predetermined temperature and an evaporator air temperature is higher than a predetermined temperature, or a face mode when the TAO is lower than the first predetermined temperature and the evaporator air temperature is lower than the predetermined temperature.

5 Claims, 4 Drawing Sheets

VEHICLE AIR-CONDITIONING SYSTEM

CROSS REFERENCE TO RELATED APPLICATION

This application is based upon, claims the benefit of priority of, and incorporates by reference, the contents of Japanese Patent Application No. 2002-239459 filed Aug. 20, 2002.

BACKGROUND OF THE INVENTION

1. Field of the Invention

The present invention relates to an air outlet mode control in a vehicular air-conditioning system, especially a control that improves the cooling sensation felt by passengers when the system automatically controls the temperature of air blown into a passenger compartment toward a target air temperature.

2. Description of the Related Art

A vehicle air-conditioning system conventionally controls a blown air temperature toward a target air temperature. Japanese Examined Patent No. Hei 6-59774 discloses a vehicle air-conditioning system. This system has the above-described automatic control feature which improves a passenger's cooling sensation by setting the air outlet mode to a bi-level mode when the cooling load is high. This blows cool air from both a face opening and a foot opening, to an upper body region and a foot region of a passenger, respectively.

In the above-described related technology, however, the cooling load evaluation is based on the target air temperature. If the target air temperature is equal to or higher than a certain temperature, namely 0 deg. C. or higher, the face mode will automatically be selected. This will blow cold air from the face opening to the upper body region of the passenger in the passenger compartment. Only if the target air temperature drops below 0 deg. C., the bi-level mode will automatically be selected. In practice, this control method causes the following problem.

The target air temperature is required to maintain the passenger compartment at a temperature set by the passenger, regardless of thermal load fluctuations in the vehicle. To achieve this result, the target air temperature is calculated based on the set temperature, the passenger compartment temperature (inside air temperature), an outside air temperature value, and a sunlight amount value.

This gives rise to a wide variation in the actual temperature of the air blown from the heat exchanger (evaporator) for cooling, which is affected by cooling load variations, even when the target air temperature is in an extremely low sub-zero temperature area (see FIG. 4 described later). In other words, even under the same condition of sub-zero target air temperature, the temperature of the air blown from the evaporator is high when the cooling load is high—such as during the time just after starting the air-conditioning system—while the air temperature blown from the evaporator drops when the cooling load drops from prolonged operation after starting the air-conditioning system.

Suppose a case where the bi-level mode is selected simply because the target air temperature meets the sub-zero condition. In this case, even when the blown air temperature is lowered due to a decrease in cooling load, the bi-level mode is maintained, and excessively cools his or her foot region by continuing to blow cold air from the evaporator. Accordingly, the passenger's sensation of cooling (amenity) may actually deteriorate.

SUMMARY OF THE INVENTION

In view of the foregoing, an object of the present invention is to improve a passenger's sensation of cooling by preventing cold air from being blown to a foot region of a passenger when the cooling load is low.

To achieve the above-mentioned object, a vehicle air-conditioning system according to a first aspect of the present invention has a heat exchanger (11) for cooling air blown into a passenger compartment, a face opening (16) through which the air having passed the heat exchanger (11) for cooling is blown to an upper body region of a passenger in the passenger compartment, a foot opening (17) through which the air having passed the heat exchanger (11) for cooling is blown to a foot region of the passenger in the passenger compartment, a temperature detecting means (27) for detecting a temperature having a direct correlation with a temperature of the air blown from the heat exchanger (11) for cooling, and a calculation means (S120) for calculating a target air temperature of the air blown into the passenger compartment.

The air-conditioning system provides at least a face mode in which the air is blown from the face opening (16) to the upper body region of the passenger in the passenger compartment, and a bi-level mode in which the air is blown from the face opening (16) and the foot opening (17) to both the upper body region and the foot region of the passenger in the passenger compartment. Here, the face mode is selected when the target air temperature is in between a first predetermined temperature (T1) and a second predetermined temperature (T2) which is higher than the first predetermined temperature (T1), and the bi-level mode is selected when the target air temperature is higher than the second predetermined temperature (T2). Furthermore, the bi-level mode is selected when the target air temperature is lower than the first predetermined temperature (T1) and the temperature detected by the temperature detecting means (27) is higher than a predetermined temperature (T4), and the face mode is selected when the target air temperature is lower than the first predetermined temperature (T1) and the temperature detected by the temperature detecting means (27) is lower than the predetermined temperature (T4).

According to the first aspect of the invention, when the target air temperature is higher than the second predetermined temperature (T2), the bi-level mode is selected, and when the target air temperature is in between the second predetermined temperature (T2) and the first predetermined temperature (T1) which is lower than the second predetermined temperature (T2), the face mode is selected. Furthermore, when the target air temperature is below the first predetermined temperature (T1), the temperature correlating with the temperature of the air blown from the heat exchanger (11) for cooling is detected to determine which of the bi-level mode or the face mode is to be selected. Accordingly, the bi-level mode is selected only when this detected temperature is higher than the predetermined temperature (T4), while the face mode is selected when the detected temperature is lower than the predetermined temperature (T4).

In the above-described mode selection, when the temperature of the air blown from the heat exchanger (11) for cooling, having a correlation with the cooling load (see FIG. 4), is higher than the predetermined temperature (T4), the increasing cooling load suggests that the passenger wants stronger cooling performance, and it is helpful to use the bi-level mode to blow the cool air not only to the upper body region but also to the foot region of the passenger for improvement in the sensation of cooling.

In addition, if continued operation of the air-conditioning system, decreasing the cooling load, lowers the temperature of the air blown from the heat exchanger (11) for cooling below the predetermined temperature (T4), the face mode will be selected to stop the air blown to the foot region of the passenger during a low cooling load operation. This prevents unpleasant sensations of the passenger's due to excessive cooling of his or her foot region.

Alternatively, in order to achieve the above-mentioned object, a vehicle air-conditioning system according to a first aspect of the present invention includes a heat exchanger (11) for cooling air blown into a passenger compartment, a face opening (16) through which the air having passed the heat exchanger (11) for cooling is blown to an upper body region of a passenger in the passenger compartment, a foot opening (17) through which the air having passed the heat exchanger (11) for cooling is blown to a foot region of the passenger in the passenger compartment, and a calculation means (S120) for calculating a target air temperature for the air blown into the passenger compartment.

The air-conditioning system provides at least a face mode in which the air is blown from the face opening (16) to the upper body region of the passenger in the passenger compartment, and a bi-level mode in which the air is blown from the face opening (16) and the foot opening (17) to both the upper body region and the foot region of the passenger in the passenger compartment. Here, the face mode is selected when the target air temperature is in between a first predetermined temperature (T1) and a second predetermined temperature (T2), which is higher than the first predetermined temperature (T1), and the bi-level mode is selected when the target air temperature is higher than the second predetermined temperature (T2). Furthermore, the bi-level mode is selected when the target air temperature is lower than the first predetermined temperature (T1) and the cooling load is high, and the face mode is selected when the target air temperature is lower than the first predetermined temperature (T1) and the cooling load is low.

According to the second aspect of the invention, a similar effect as in the first aspect can be obtained, when the target air temperature is below the first predetermined temperature (T1), by selecting the bi-level mode if the cooling load is high, or by selecting the face mode if the cooling load is low.

According to a third aspect of the present invention, in the vehicle air-conditioning system according to the second aspect, a degree of the cooling load can be evaluated on the basis of a temperature correlating with a temperature of the air blown from the heat exchanger (11) for cooling.

According to a fourth aspect of the present invention, the vehicle air-conditioning system according to any one of the first to third aspects may include a heat exchanger (12) for heating the air having passed the heat exchanger (11) for cooling on a downstream side of the heat exchanger (11) for cooling. The system is configured such that a foot mode can be set in which the air having passed the heat exchanger (12) for heat is blown into the foot region of the passenger from the foot opening (17). Here, when the target air temperature is higher than a third predetermined temperature (T3) which is higher than the second predetermined temperature (T2), the bi-level mode is changed to the foot mode.

According to the fourth aspect of the invention, when the target air temperature is higher than a temperature at which the bi-level mode is selected, the foot mode is automatically selected to provide air conditioning for heating the passenger compartment.

Incidentally, the parenthesized numerals accompanying the foregoing individual means correspond with concrete means seen in the embodiments to be described later.

DETAILED DESCRIPTION OF THE PREFERRED EMBODIMENTS

First Embodiment

Figure 1:
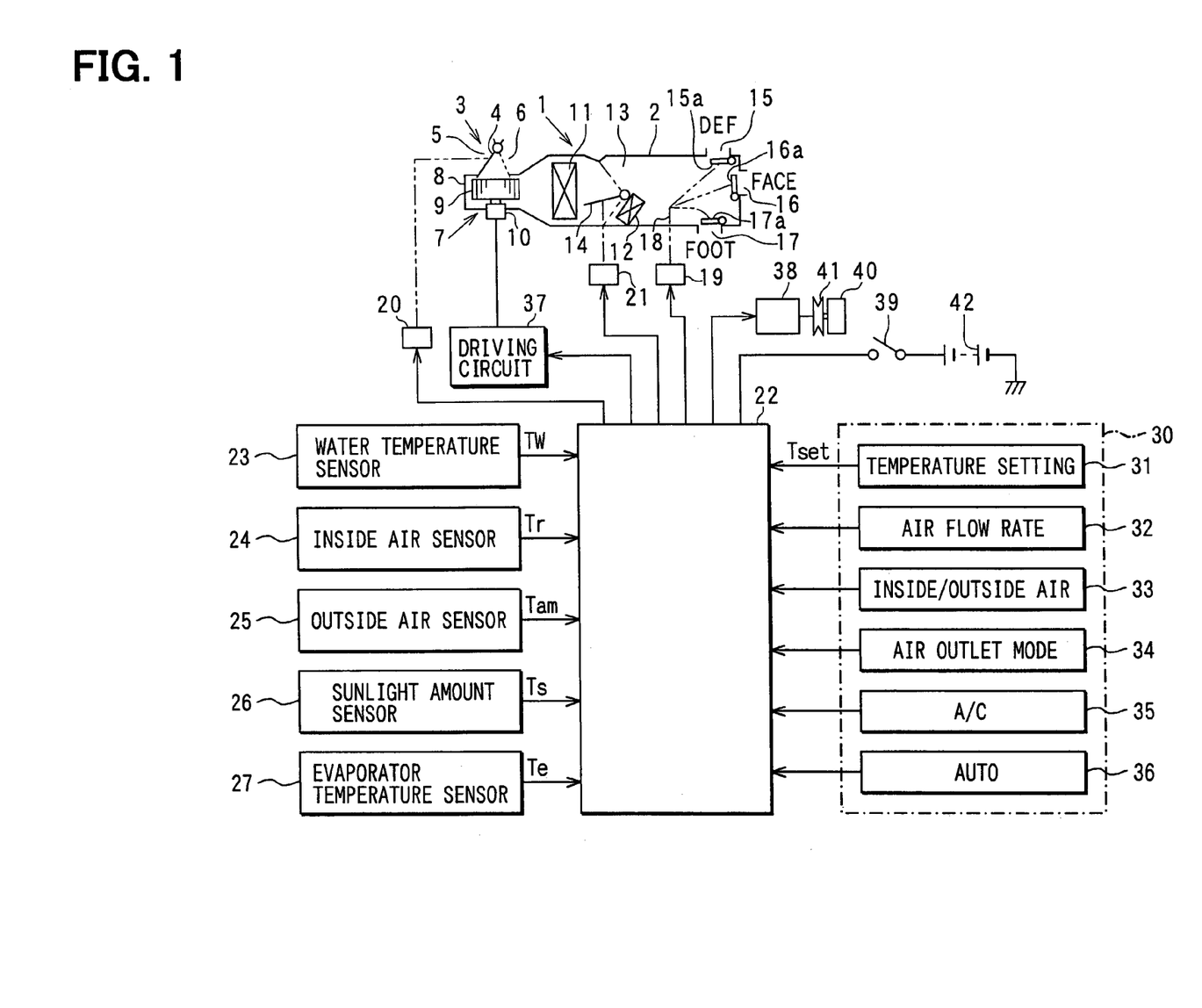
FIG. 1 is an overall configuration schematic of one embodiment of the present invention.
Figure 5:
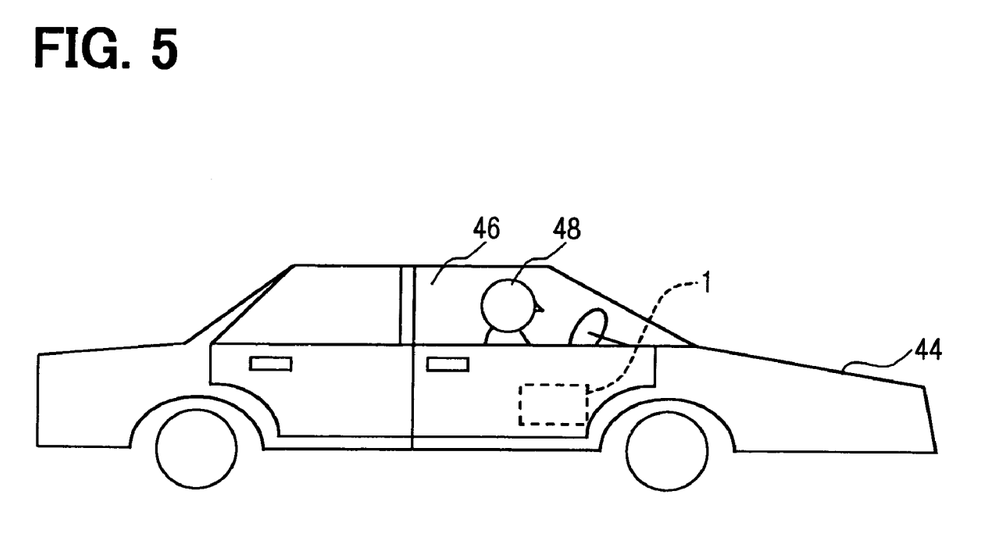
FIG. 5 is a side view of an automobile showing general locations of pertinent aspects of one embodiment of the present invention.

FIG. 1 shows the overall configuration of a vehicle air-conditioning system according to a first embodiment of the present invention. An air conditioner case 2, of an air conditioner unit 1, is disposed inside the console panel in the front portion of the passenger compartment. FIG. 5 shows an example of an automobile 44 housing the air conditioner unit 1. This case 2 creates an air flow path into the passenger compartment 46 to create a comfortable environment for a passenger 48. An inside/outside air switching box 3 is disposed at the upstream end in the air conditioner case 2. Either the air inside the vehicle (inside air), or the air outside the vehicle (outside air), can be selected to introduce the air into the passenger compartment by opening or closing an inside air inlet 5, and an outside air inlet 6, using an inside/outside air switching door 4 within the inside/outside air switching box 3. A blower 7 is disposed on the downstream side of the inside/outside air switching box 3. A centrifugal fan 9 is enclosed in a case 8 of the blower 7, and rotated by the drive motor 10.

An evaporator 11 is disposed on the downstream side of the blower 7 and acts as a heat exchanger for cooling. The evaporator 11 is provided to form part of the refrigerating cycle in conjunction with a compressor 40 driven by a vehicle's engine (not shown). Low pressure refrigerant flown into the evaporator 11 absorbs heat from the air blown from the blower 7 during evaporation to cool the air. The compressor 40 is equipped with an electromagnetic clutch 41 that controls transmission of the power from the vehicle engine.

A warm water circulating heater core 12 is disposed on the downstream side of the evaporator 11 in the air conditioner case 2, and acts as a heat exchanger for heating. The warm water circulating heater core 12 heats the air using warm water (cooling water) from the vehicle engine as its heat source. A bypass path 13 is formed on the side of the warm water circulating heater core 12 to enable air flow to bypass the warm water circulating heater core 12.

As a temperature adjusting means, an air mixing door 14 is rotatably disposed in between the evaporator 11 and the heater core 12. The air mixing door 14 is composed of a plate-shaped door, and regulates the temperature of the air blown into the passenger compartment by adjusting the mixture ratio of the warm air passing through the circulating heater core 12 and the cool air passing through the bypass path 13. Air with a target temperature can be created on the downstream side of the warm water circulating heater core 12 by mixing the warm air passing through the warm water circulating heater core 12 and the cool air passing through the bypass path 13.

In addition, a defroster opening 15, a face opening 16, and a foot opening 17, open their outlets at the downstream end of the air conditioner case 2, and constitute an air outlet mode switching portion. The defroster opening 15 blows air onto the inside surface of the vehicle windshield from a defroster duct (not shown), and has a rotatable plate-shaped defroster door 15a. The defroster opening 15 is able to be opened or closed by the door 15a.

The face opening 16 blows air directed to the upper body region of a passenger in the passenger compartment via a face duct (not shown), and has a rotatable plate-shaped face door 16a. The face opening 16 is able to be opened or closed by the door 16a. The foot opening 17 blows air to the foot region of the passenger in the passenger compartment via a face duct (not shown), and has a rotatable plate-shaped face door 17a. The foot opening 17 is able to be opened or closed by the door 17a.

In the above-described outlet configuration, the outlet mode doors 15a, 16a, and 17a are connected to a common link mechanism 18, through which the outlet mode doors 15a, 16a, and 17a are driven by an electric driver unit 19. The inside/outside air switching door 4 and the air mixing door 14 are driven by respective electric driver units 20, 21 comprising servomotors.

In this embodiment, opening or closing the outlet mode doors 15a, 16a and 17a allows the user to alternate between settings:

i) the face mode, wherein air is blown from the fully opened face opening 16 to the upper body region of a passenger in the passenger compartment;

ii) the bi-level mode, wherein the air is blown from the opened face opening 16 and the foot opening 17 into both the upper body and foot regions of a passenger in the passenger compartment;

iii) the foot mode, wherein the air is blown mainly from the fully opened foot opening 17 but with a small amount from the partially (by a small degree) opened defroster opening 15;

iv) a foot defroster mode, wherein the air is blown less through the foot opening 17 than in the foot mode but from the defroster opening 15 more than in the foot mode—the foot opening 17 and the defroster opening 15 being opened by substantially the same amount; and v) the defroster mode, wherein the air is blown from the fully opened defroster opening 15 to the inside surface of the vehicle windshield.

Referring to the electric control portion of the present invention, an electronic control unit 22 for an air-conditioning system includes a well known microcomputer circuit incorporating CPU, ROM, and RAM, and associated peripheral circuits. For air conditioning control, detected signals are input to the electronic control unit 22 from sensors 23 to 27. They detect a temperature of warm water Tw, an inside air temperature Tr, an outside air temperature Tam, a sunlight amount Ts, a temperature of air blown from evaporator Te representing cooling performance of the evaporator, and the like.

In addition, the following control members for manual operation by the passenger are provided on the air conditioner operation panel 30 disposed near a console panel in the passenger compartment. Operation signals from these control members are also input to the electronic control unit 22.

The control members for manual operation on the air conditioner operation panel 30 include: a temperature setting device 31 for generating a temperature setting signal Tset to set the passenger compartment temperature; an air flow switch 32 for generating an air flow switching signal for the blower 7; an inside/outside air switch 33 for generating an inside and outside air switching signal; an air outlet mode switch 34 for generating an air outlet mode signal; an air conditioner switch 35 for generating an ON/OFF signal to control the electromagnetic clutch 41 for the compressor 40 incorporated in the refrigerating cycle; and an auto switch 36 for setting an automatic control mode for air conditioning.

In this embodiment, the air outlet mode switch 34 includes options to manually set the face, bi-level, foot, foot defroster, and defroster modes. To control the rotating speed of the blower 7, a driving circuit 37 controls a voltage to be applied to the motor 10 for driving the blower 7. A driving circuit 38 controls the power supply to the electromagnetic clutch 41 of the compressor 40. A battery 42 mounted on the vehicle supplies the power to the electronic control unit 22 for the air-conditioning system through the ignition switch 39 of the vehicle engine.

Figure 2:
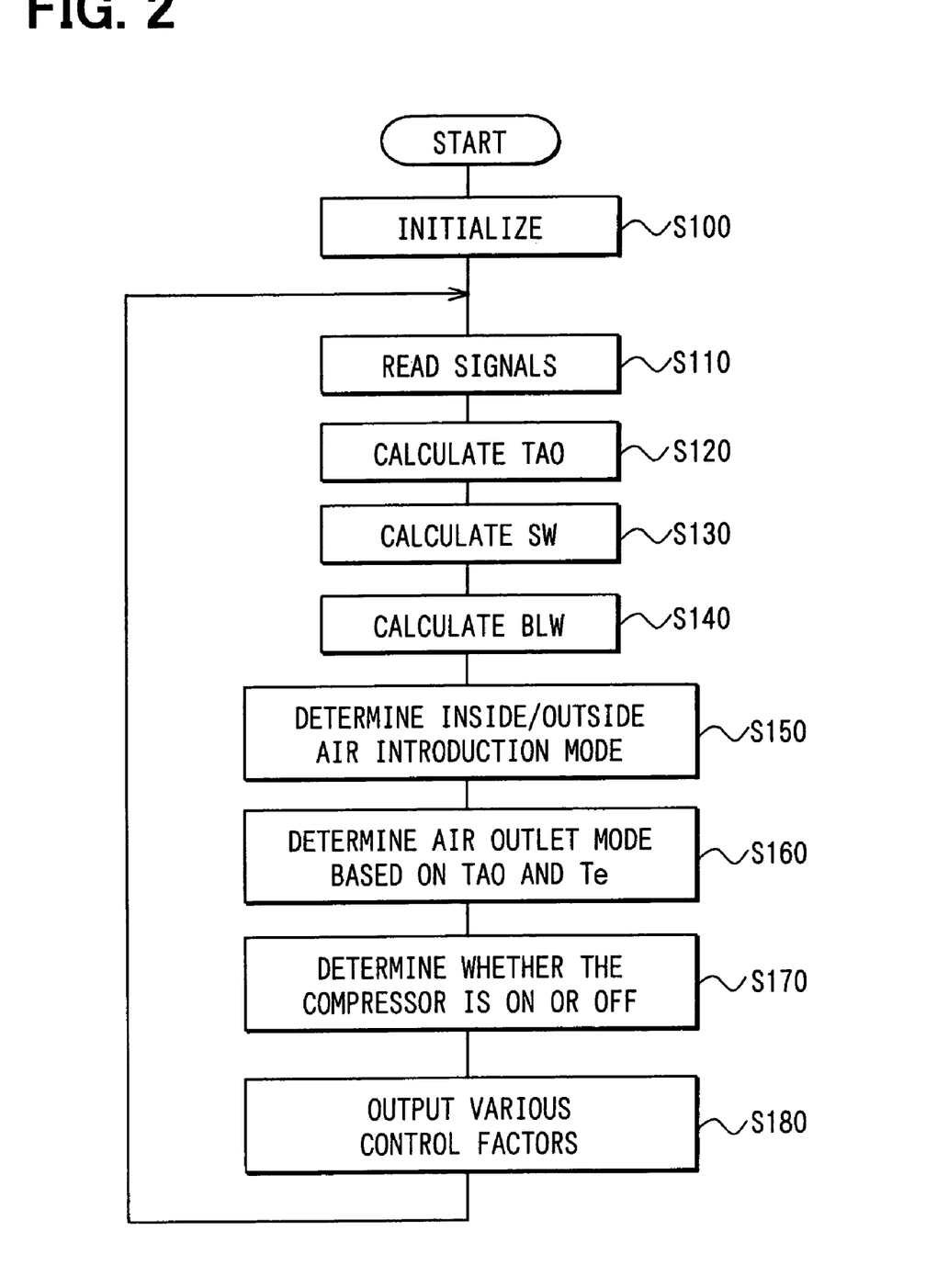
FIG. 2 is a flow chart showing the outline of a system operation according to one embodiment of the present invention.

In the above-described configuration, the operation of this embodiment will be described below. The flow chart shown in FIG. 2 shows the outline of a control process executed by the microcomputer of the electronic control unit 22. Here, a control routine, shown in FIG. 2, starts when the auto switch 36 on the air conditioner operation panel 30 is turned on after the ignition switch 39 of the vehicle engine is turned on, thereby supplying power to the electronic control unit 22.

At first, in step S100, flags and timers are initialized. Next, in step S110, detected signals from a group of the sensors, 23 to 27 and operation signals from the control members 31 to 36 on the panel 30 are read.

Next, in step S120, the target air temperature TAO is calculated for air blown into the passenger compartment, based on the following Equation 1. This target air temperature TAO is required to maintain the passenger compartment at Tset, the temperature set by a temperature setting switch 37a, regardless of changes in the heat load condition of the vehicle air conditioning.

$$TAO = Kset \times Tset - Kr \times Tr - Kam \times Tam - Ks \times Ts + C \qquad \text{Eq.1}$$

Wherein: Tr is the temperature of air inside vehicle detected by the inside air sensor 24; Tam is the temperature of air outside the vehicle detected by the outside air sensor 25; Ts is the sunlight amount detected by the sunlight amount sensor 26; Kset, Kr, Kam, and Ks are control gains; and C is a constant for compensation.

Next, in step S130, the target opening degree SW of the air mixing door 14 is calculated based on the following Equation 2:

$$SW = \{(TAO - Te)/(Tw - Te)\} \times 100(\%) \qquad \text{Eq. 2}$$

Wherein: Te is the temperature of air blown from the evaporator detected by the evaporator temperature sensor 27, and Tw is the temperature of heater core warm water detected by the water temperature sensor 23.

Next, in step S140, the target air flow BLW of the air blown by the fan 9, is calculated based on the above value for TAO. This target air flow BLW is increased for TAO in the higher temperature region (maximum heating side) and in the lower temperature region (maximum cooling side), though decreased for TAO in the middle temperature region.

Next, in step S150, the inside/outside air introduction mode is determined. It will be apparent to those skilled in the art that, as TAO rises from a low temperature region to a high temperature region, the inside/outside air introduction mode is changed from All INSIDE AIR MODE to INSIDE AND OUTSIDE AIR MIXED MODE and then to ALL OUTSIDE AIR MODE, or alternatively from All INSIDE AIR MODE to ALL OUTSIDE AIR MODE.

Next, in step S160, the air outlet mode is determined according to the above-mentioned TAO and the evaporator air temperature Te. Details of the air outlet mode will be described later with reference to FIG. 3.

Next, in step S170, the intermittent operation (ON-OFF) of the compressor 40 is determined. The intermittent operation of the compressor 40 is determined by comparing the actual evaporator air temperature Te with the target evaporator air temperature TEO. That is, if the evaporator air temperature Te becomes lower than the target evaporator air temperature TEO, the compressor 40 will stop (OFF). If, on the other hand, the evaporator air temperature Te exceeds the target evaporator air temperature TEO, the compressor 40 will start (ON). It will be apparent to those skilled in the art that the target evaporator air temperature TEO is determined based on factors including TAO and the outside air temperature Tam.

Next, in step S180, control factors calculated in the above steps S130–S170 are output to the respective electric driving units 19, 20, and 21, and driving circuits 37, 38 so as to control the air conditioning. That is, to attain the inside and outside air mode of step S150, the electric driving unit 20, for switching the inside and outside air, controls the operating position of the inside/outside air switching door 4. On the other hand, to attain the air outlet mode of step S160, the electric driving unit 19 for the air outlet mode controls the operating position of the air outlet mode doors 15a, 16a, and 17a.

Furthermore, to match an actual air mixing door opening degree to the target opening degree SW in step S130, the electric driving unit 21 for mixing air controls the opening degree of the air mixing door 14. To obtain the target air flow BLW of step S140, the fan rotating speed is controlled by varying the applied voltage to the motor 10 driving the fan. To match the actual evaporator air temperature Te to the target evaporator air temperature TEO, the electromagnetic clutch 41 controls the ON-OFF operation of the compressor 40.

Figure 3:
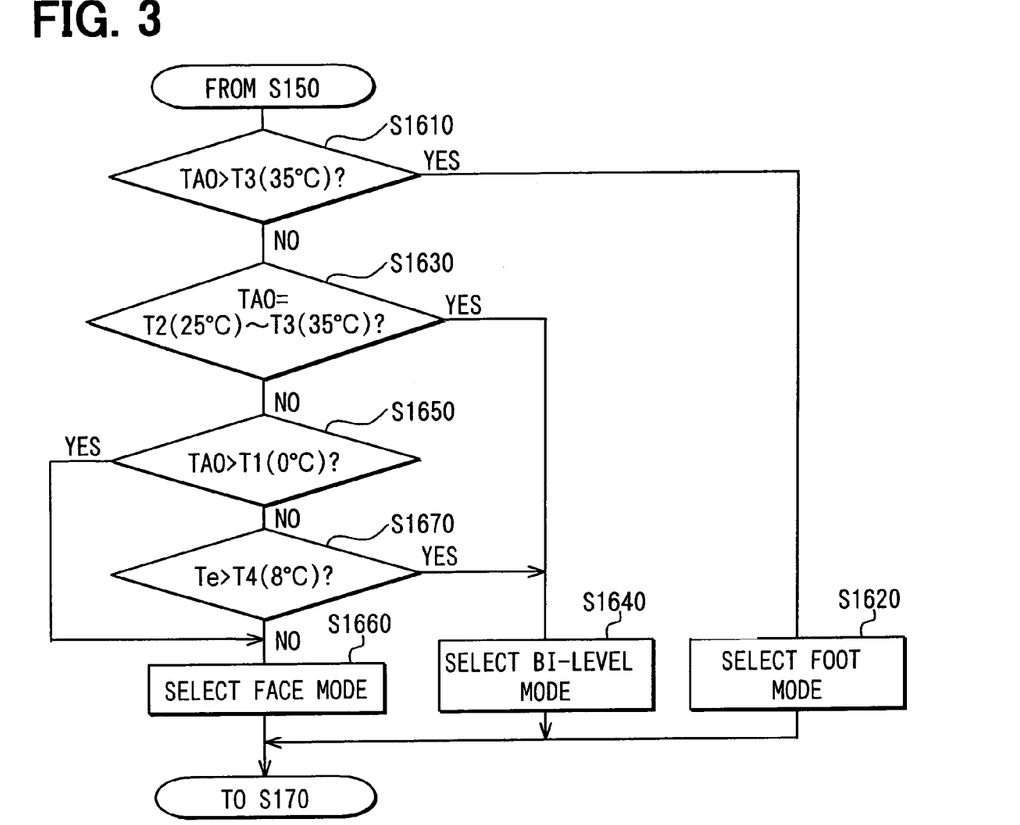
FIG. 3 is a flow chart showing the essential points of the flow shown in FIG. 2.

Next, FIG. 3 describes a control process to determine the air outlet mode. In step S1610, it is determined whether TAO is higher than a third predetermined temperature T3, which is a temperature to determine if TAO is in the high temperature region of the heating range such as 35° C. If the determination in step S1610 is YES, the process proceeds to step S1620 to select the foot mode.

In the foot mode, the electric driving unit 19 drives the air outlet mode doors 15a, 16a, and 17a so that the air will be blown mainly from the foot opening 17 with only a little from the defroster opening 15. Alternatively, if the determination in step S1610 is NO, the process proceeds to step S1630 to determine if TAO is in between a second predetermined temperature T2 and the third predetermined temperature T3. Here, the second predetermined temperature T2 is a middle temperature value lower than the third predetermined temperature T3, e.g. 25° C. If the determination in step S1630 is YES, the process proceeds to step S1640 to select the bi-level mode.

In the bi-level mode, the outlet mode doors 15a, 16a and 17a are driven by the electric driving unit 19 to open both the face opening 16 and the foot opening 17 to direct air to the upper body region and foot region of the passenger in the passenger compartment. If the determination in step S1630 is NO, the process proceeds to step S1650 to determine if TAO is higher than a first predetermined temperature T1. Here, the first predetermined temperature T1 is a temperature in the low temperature region and considerably lower than the second predetermined temperature T2, e.g. 0° C. If the determination in step S1650 is YES, i.e. 0° C.<TAO<25° C.—the process proceeds to step S1660 to select the face mode.

In the face mode, the outlet mode doors 15a, 16a, and 17a are driven by the electric driving unit 19 to fully open the face opening 16 to direct air to the upper body region of the passenger in the passenger compartment. Alternatively, if the determination in step S1650 is NO, the process proceeds to step S1670 to determine if the evaporator air temperature Te is higher than a predetermined temperature T4. Here, the predetermined temperature T4 is a temperature used to determine whether the cooling load of the evaporator 11 is in a high condition, e.g. 8° C.

If the determination in step S1670 is YES, the process proceeds to step S1640 to select the bi-level mode. If the determination in step S1670 is NO, the process proceeds to step S1660 to select the face mode.

As mentioned above, the air outlet mode can be determined based on TAO and the evaporator air temperature Te. As for the temperature region for TAO:

(1) For TAO>35° C., which is in the high temperature region required for blown air for winter heating, the foot mode is selected in step S1620 to direct air (warm air) mainly to the foot region of a passenger from the foot opening 17 to warm the passenger compartment.

(2) For 25° C.<=TAO<=35° C., which is representative of a middle temperature region required for blown, air during moderate seasons, such as spring and fall, the bi-level mode is selected in step S1640 to direct air to the upper body region and foot region of a passenger via both the face opening 16 and the foot opening 17. Here, comfortable air conditioning can be performed by a blown air temperature distribution. This is achieved by setting the predetermined temperature of the air blown to the face lower than that to the foot region.

(3) 0° C.<TAO<25° C. represents a relatively higher temperature region for the cooling target air temperature. Accordingly, the condition, 0° C.<TAO<25° C., should be used as a target air temperature region when a cooling effect has been achieved in the passenger compartment after the temperature in the compartment has dropped a certain degree during a cooling down period just after cooling begins.

Since the passenger has already had a sensation of cooling when this target air temperature region has been achieved in the passenger compartment, continued cool air blowing from the foot opening 17 to the foot region of the passenger may give the passenger an uncomfortable cold feeling in the area of his feet. To avoid the above-described condition, when in a relatively higher temperature region for the cooling target air temperature, such as 0° C.<TAO<25° C., the face mode is selected to prevent an uncomfortable sensation from cool air being blown to the foot region of the passenger via the foot opening 17.

Figure 4:
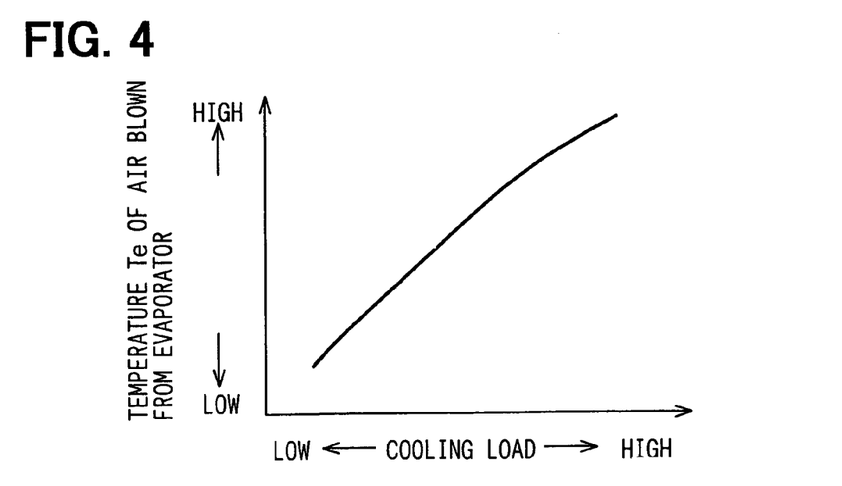
FIG. 4 is a graph showing a relationship between the evaporator air temperature and the cooling load.

(4) In the case of an extremely low temperature region of the target air temperature as TAO<=0° C. and Te<=8° C., the face mode is selected because of the following reasons:

Accordingly, the cooling load of the evaporator 11 varies depending on the condition (temperature and humidity) and the amount of the air drawn into the evaporator 11, and wherein the higher the cooling load of the evaporator 11, the higher the evaporator air temperature Te is, as shown in FIG. 4. The evaporator air temperature Te, which has an inverse correlation with the cooling capacity of the evaporator 11, presents information about both, the cooling load and cooling capacity of the evaporator 11. The cooling capacity of the evaporator 11 has a correlation with the refrigerant displacement rate of the compressor 40, that is, the rotating speed of the compressor.

TAO is a target temperature calculated in step S120, while the evaporator air temperature Te is an actual temperature representing the cooling load and cooling capacity of the evaporator 11 as mentioned above. In addition, after a certain period of time from the starting of cooling, cool air having a temperature similar to the evaporator air temperature Te directly blows into the passenger compartment as a result of the air mixing door 14 being maintained in a maximum cooling position to close the air path in the heater core during that time. Accordingly, the evaporator air temperature Te enhances a passenger's sensation of cooling and comfort more than TAO during the initial stage of cooling.

Here, even in an extremely low temperature region as TAO<=0° C., if Te<=8° C., the condition in the passenger compartment can be assessed to determine if the temperature of air in the passenger compartment (inside air temperature Tr) and the cooling load have dropped. Comfort can be secured by using the face mode to stop cold air flowing from the foot opening 17 to the foot region of the passenger.

(5) In the condition of the extremely low temperature region of the target air temperature, such as TAO<=0° C. and Te>8° C., the condition in the passenger compartment can be assessed to determine whether the cooling load is high because only a short period of time has passed since the start of cooling. Since a passenger typically wishes to have a strong sensation of cooling in this condition, the bi-level mode is selected to blow cool air to the upper body region and foot region of the passenger, using both the face opening 16 and the foot opening 17.

This bi-level mode gives the sensation of cooling to the entire body of the passenger so as to improve his or her comfort at the stage immediately after the start of cooling and where the cooling load is high. In this case, since the evaporator air temperature Te is higher than 8° C., the passenger will not have any feeling of excessive cooling in the foot region.

(Other Embodiments)

Although in the above embodiment, the air outlet mode is determined based on TAO and the evaporator air temperature Te, factors having a direct correlation with the evaporator air temperature Te, such as the surface temperature of the evaporator fin, can be detected and used instead of the evaporator air temperature Te.

Other than the above-described embodiment, where an air-conditioning system controls the evaporator air temperature Te by controlling the intermittent operation of the compressor 40, the present invention is not limited thereto. Thus, the present invention is naturally applicable to other types of air-conditioning systems that use other means to control the evaporator air temperature Te. For instance, one could use a variable capacity compressor as a compressor 40 that can vary its discharge to control the evaporator air temperature Te, or use an electric compressor as a compressor 40 that can control its rotating speed to control the evaporator air temperature Te.

What is claimed is:

1. A vehicle air-conditioning system comprising:
a cooling heat exchanger for cooling air blown into a passenger compartment;
a face opening through which the air having passed the cooling heat exchanger is blown to an upper body region of a passenger in the passenger compartment;
a foot opening through which the air having passed the cooling heat exchanger is blown to a foot region of the passenger in the passenger compartment;
temperature detecting means for detecting a temperature having a direct correlation with a temperature of the air blown from the cooling heat exchanger; and
calculation means for calculating a target air temperature of the air blown into the passenger compartment,
wherein the air-conditioning system provides at least a face mode in which the air is blown from the face opening to the upper body region of the passenger in the passenger compartment, and a bi-level mode in which the air is blown from the face opening and the foot opening to both the upper body region and the foot region of the passenger in the passenger compartment, and
wherein the system is configured such that the face mode is selected when the target air temperature is between a first predetermined temperature and a second predetermined temperature, which is higher than the first predetermined temperature,
the bi-level mode is selected when the target air temperature is higher than the second predetermined temperature,
the bi-level mode is selected when the target air temperature is lower than the first predetermined temperature and the temperature detected by the temperature detecting means is higher than a predetermined temperature, and
the face mode is selected when the target air temperature is lower than the first predetermined temperature and the temperature detected by the temperature detecting means is lower than the predetermined temperature.

2. The vehicle air-conditioning system according to claim 1, further comprising:
a heating heat exchanger for heating the air having passed the cooling heat exchanger on a downstream side of the cooling heat exchanger,
wherein the system is configured such that a foot mode can be set in which the air having passed the cooling heat exchanger is blown into the foot region of the passenger from the foot opening, and
wherein when the target air temperature is higher than a third predetermined temperature, which is higher than the second predetermined temperature, the bi-level mode is changed to the foot mode.

3. The vehicle air-conditioning system according to claim 1, wherein the temperature detecting means is a temperature sensor for detecting the temperature of the air blown from the cooling heat exchanger.

4. A vehicle air-conditioning system comprising:
a cooling heat exchanger air blown into a passenger compartment;
a face opening through which the air having passed the cooling heat exchanger for cooling is blown to an upper body region of a passenger in the passenger compartment;
a foot opening through which the air having passed the cooling heat exchanger is blown to a foot region of the passenger in the passenger compartment; and calculation means for calculating a target air temperature for the air blown into the passenger compartment, wherein the system is configured such that the air-conditioning system provides at least a face mode in which the air is blown from the face opening to the upper body region of the passenger in the passenger compartment, and a bi-level mode in which the air is blown from the face opening and the foot opening to both the upper body region and the foot region of the passenger in the passenger compartment, and wherein the face mode is selected when the target air temperature is between a first predetermined temperature and a second predetermined temperature, which is higher than the first predetermined temperature, the bi-level mode is selected when the target air temperature is higher than the second predetermined temperature, the bi-level mode is selected when the target air temperature is lower than the first predetermined temperature and a cooling load is high, the face mode is selected when the target air temperature is lower than the first predetermined temperature and the cooling load is low; and a degree of the cooling load is evaluated on the basis of a temperature having a direct correlation with a temperature of the air blown from the cooling heat exchanger.

5. The vehicle air-conditioning system according to claim 4, further comprising:

a heating heat exchanger for heating the air having passed the cooling heat exchanger on a downstream side of the cooling heat exchanger, wherein the system is configured such that a foot mode can be set in which the air having passed the heating heat exchanger is blown into the foot region of the passenger from the foot opening, and wherein when the target air temperature is higher than a third predetermined temperature, which is higher than the second predetermined temperature, the bi-level mode is changed to the foot mode.

* * * * *